United States Patent
Herrera et al.

(10) Patent No.: US 8,067,719 B2
(45) Date of Patent: Nov. 29, 2011

(54) APPARATUS AND METHOD FOR CAPTURING AND DISPLAYING IMAGES OF THE UNDERCARRIAGE OF VEHICLES INCLUDING ONE OR MORE SCENE CAMERAS

(75) Inventors: Juan A. Herrera, Knoxville, TN (US); Charles A. Cruey, Lenoir City, TN (US); George E. Deichert, Knoxville, TN (US); Alfred L Marston, III, Knoxville, TN (US); Anthony S. Nelms, Knoxville, TN (US); Christopher C. Richardson, Maryville, TN (US); Kent A. Rinehart, Knoxville, TN (US); Richard P. Williams, Andersonville, TN (US); Charles L. Guffey, Sweetwater, TN (US); Augustin L. Manolache, Knoxville, TN (US)

(73) Assignee: Perceptics, LLC, Knoxville, TN (US)

( * ) Notice: Subject to any disclaimer, the term of this patent is extended or adjusted under 35 U.S.C. 154(b) by 1138 days.

(21) Appl. No.: 11/840,256

(22) Filed: Aug. 17, 2007

(65) Prior Publication Data
US 2008/0211914 A1    Sep. 4, 2008

Related U.S. Application Data

(63) Continuation of application No. PCT/US2005/005710, filed on Feb. 24, 2005.

(51) Int. Cl.
*H01L 27/00*    (2006.01)
(52) U.S. Cl. .................. 250/208.1; 250/559.46
(58) Field of Classification Search ............... 250/208.1, 250/221, 559.4, 559.44, 559.46; 348/143–148, 348/151, 156, 159
See application file for complete search history.

(56) References Cited

U.S. PATENT DOCUMENTS 6,856,344 B2    2/2005    Franz
7,102,665 B1 *  9/2006    Chandler et al. .............. 348/148

* cited by examiner

*Primary Examiner* — Que T Le
(74) *Attorney, Agent, or Firm* — DLA Piper LLP US

(57) ABSTRACT

A portable undercarriage vehicle inspection system (UVIS) (100) uses an under vehicle imaging (UVI) module (110) to capture an image of the undercarriage of a vehicle. The UVIS also includes multiple scene cameras (120) that capture the associated vehicle scene images. The scene cameras are easy to view and manipulate. The undercarriage image and the associated vehicle scene images are provided to a power and communications unit (PCU) (140) through a network (130) such as Ethernet. These images may be stored in a database repository connected to the network. A notebook computer will serve as an operator workstation (150, 152, 154) for display of real-time, as well as historical, vehicular records. An operator viewing the images can enter additional information related to the images, such as comments and remarks, and archive all of the information for future reference and comparisons.

37 Claims, 18 Drawing Sheets

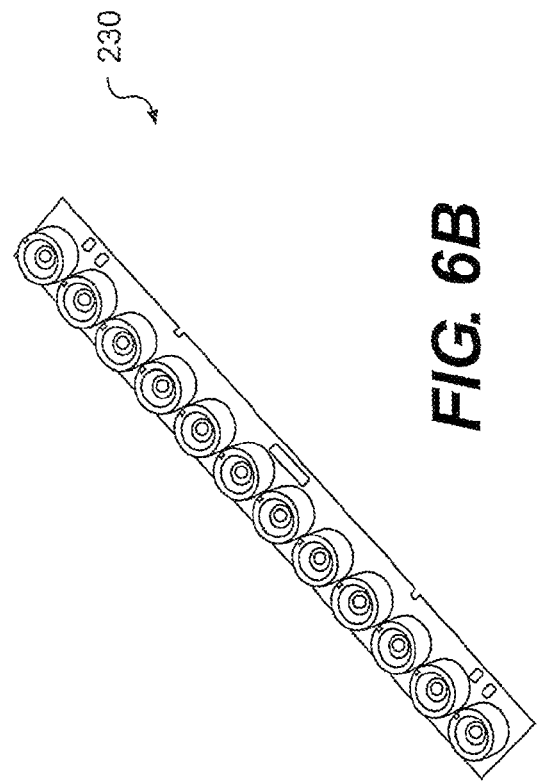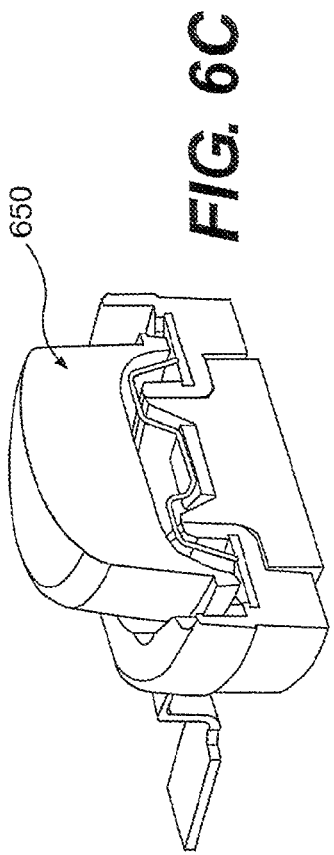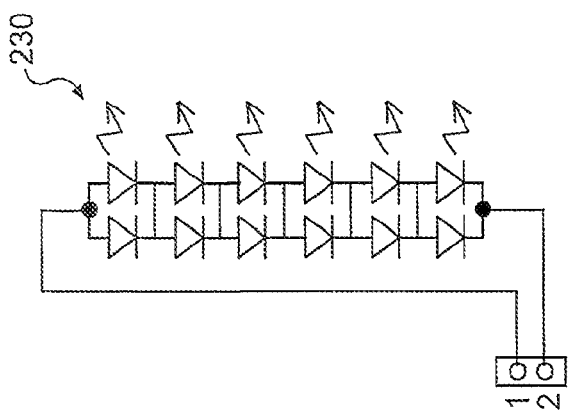

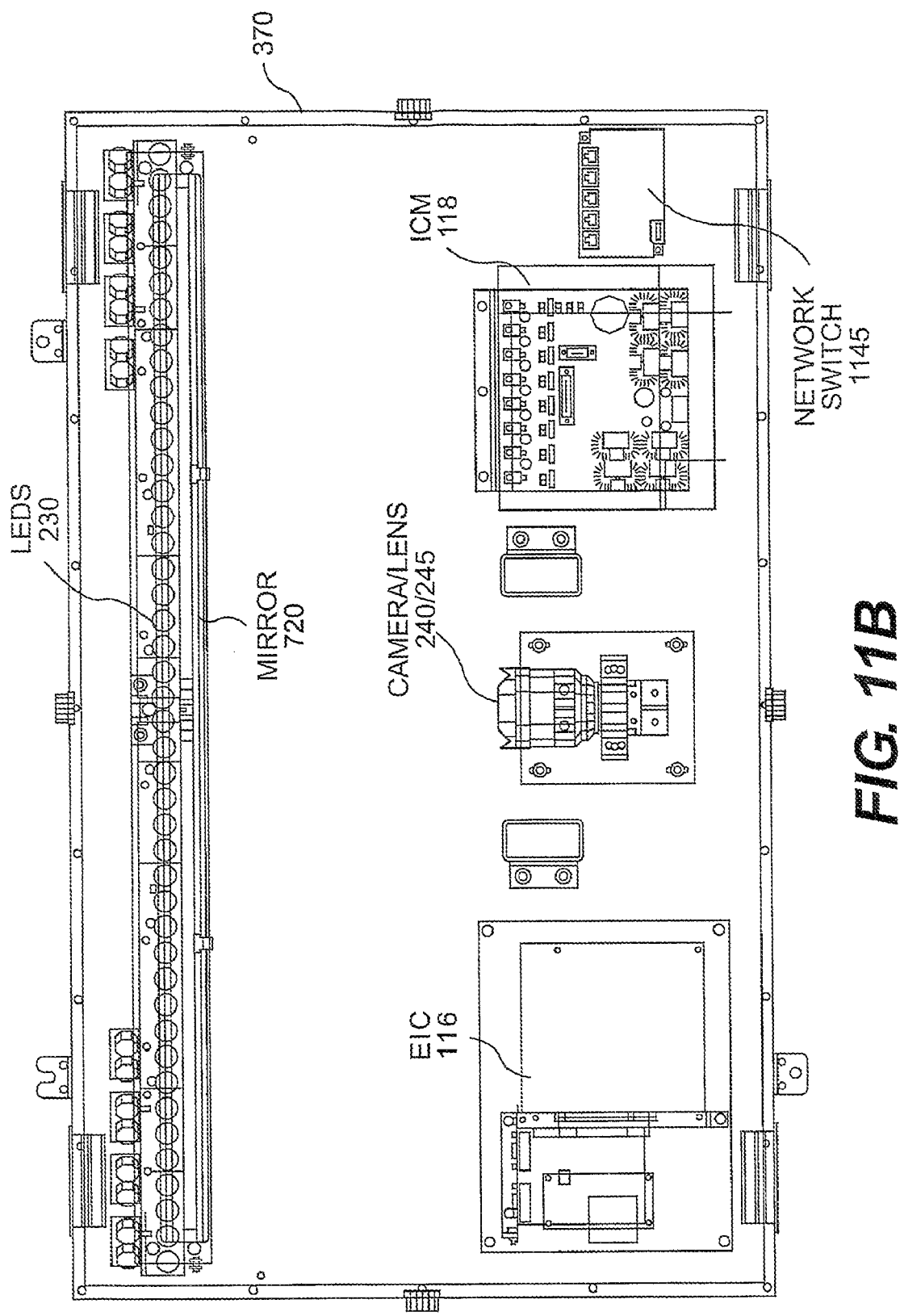

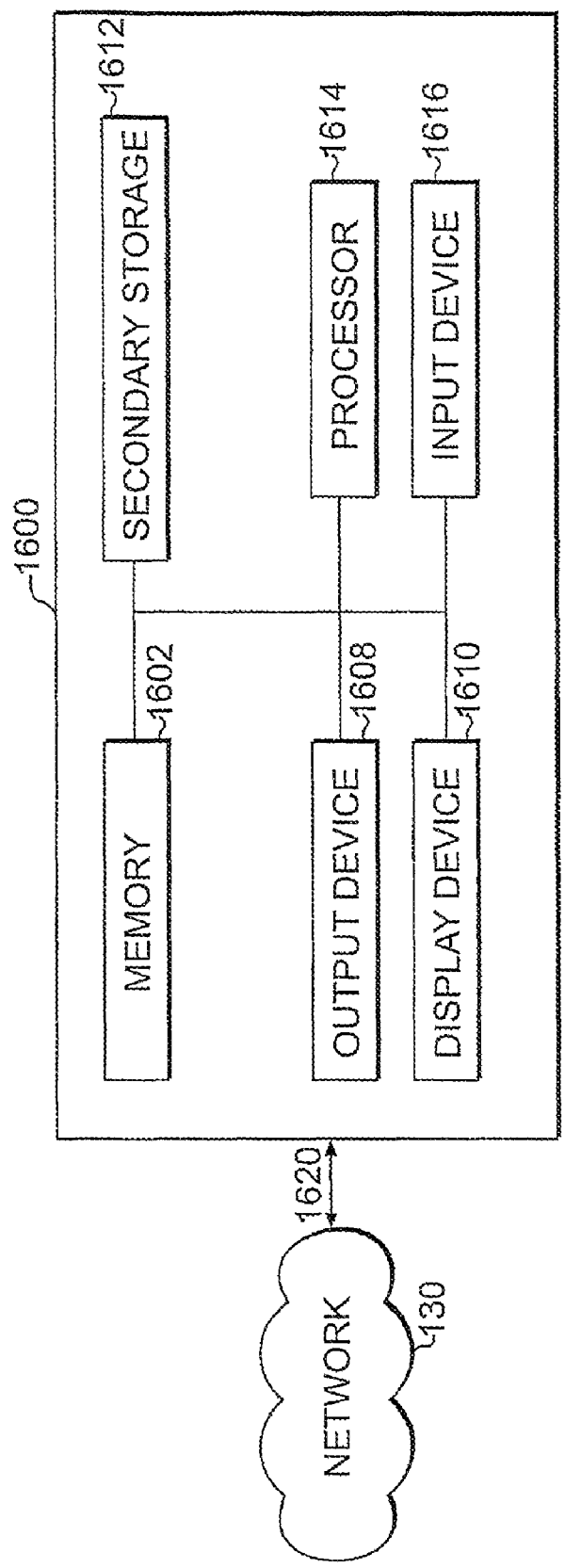

APPARATUS AND METHOD FOR CAPTURING AND DISPLAYING IMAGES OF THE UNDERCARRIAGE OF VEHICLES INCLUDING ONE OR MORE SCENE CAMERAS

TECHNICAL FIELD

The technical field relates to vehicle undercarriage imaging systems, and, in particular, to an apparatus and method for capturing and displaying images of the undercarriage of vehicles.

BACKGROUND

Ensuring security is a major challenge to most private and public facilities. More and more facilities use heightened security procedures to monitor and inspect vehicles passing through a designated location. Systems that provide automatic vehicle identification and classification are no longer sufficient to provide the needed security. Since contraband and explosives are often hidden in a vehicle's undercarriage, under vehicle surveillance systems are in increasing demand, especially at military installations, prisons, airports, seaports, or other public facilities.

Most existing under vehicle surveillance systems use a central personal computer (PC) to control cameras and manage the capturing and displaying of images. With this current design, extensive and complex cable connections are involved. Other systems use multiple cameras similar to a digital video system. However, such a multi-camera system is slow and difficult to operate. Still other systems use area line scan cameras, such as a color tri-linear charge-coupled device (CCD), to capture composite images of a vehicle's undercarriage and combine the multiple images to display a complete undercarriage image. However, the generated image typically has motion color skew that is undesirable.

SUMMARY

A method for capturing and displaying vehicle undercarriage images includes detecting a vehicle's presence and acquiring an undercarriage image of the vehicle using a line scan camera. The method further acquires scene images associated with the vehicle using one or more scene cameras. The line scan camera and the one or more scene cameras are controlled by an under vehicle imaging (UVI) module and a power and communications unit (PCU). The UVI and the PCU are connected to a network. The method further transmits the undercarriage image and the scene images to one or more operator workstations through the network. The method further includes storing the undercarriage image and the scene images in a relational database connected to the network and displaying the undercarriage image and the scene images to an operator.

A corresponding apparatus for capturing and displaying vehicle undercarriage images includes an under vehicle imaging (UVI) module and a power and communications unit (PCU) connected to the UVI module. The UVI includes one or more sensors that detect a vehicle's presence, a line scan camera that acquires an undercarriage image of the vehicle, and one or more scene cameras that acquire scene images associated with the vehicle. The UVI further includes an embedded imaging controller (EIC) that controls the line scan camera and the one or more scene cameras. The UVI further includes an illumination control module (ICM) that is connected to the one or more sensors and controls one or more illuminators. The illuminators illuminate the undercarriage of the vehicle when the line scan camera acquires the undercarriage image. The UVI and the PCU are connected to a network. The undercarriage image and the scene images are transmitted through the network to one or more operator workstations. The apparatus further includes a relational database connected to the network for storing the undercarriage image and the scene images.

DESCRIPTION OF THE DRAWINGS

The exemplary embodiments of the apparatus and method for capturing and displaying vehicle undercarriage images will be described in detail with reference to the following figures, in which like numerals refer to like elements, and wherein:

FIGS. 6A and 6B illustrate twelve exemplary illuminators controlled by the ICM of FIG. 5;

FIG. 6C illustrates a single illuminator of FIGS. 6A-6B;

FIG. 11B illustrates an exemplary placement of the components of the UVI module within the enclosure of FIG. 11A:

FIG. 16 illustrates exemplary hardware components of a computer that may be used in connection with the exemplary method for capturing and displaying vehicle undercarriage images.

DETAILED DESCRIPTION

An apparatus and method for capturing and displaying vehicle undercarriage images use a portable undercarriage vehicle inspection system (UVIS) to inspect the undercarriage of vehicles, such as passenger, commercial, and military vehicles. The UVIS may be used with security and access control applications to inspect the undercarriage of vehicles to detect contraband, explosives, and other security breach items. The UVIS may automatically detect the presence and direction of travel of any vehicle that travels over an embedded device, such as an under vehicle imaging (UVI) module. Once a vehicle is detected, the UVI module of the UVIS automatically captures a high-resolution color image of the vehicle's undercarriage. One or more scene cameras can be used to capture other vehicle scene images associated with the vehicle and its passengers.

The undercarriage image and the associated vehicle scene images may be immediately transmitted to a power and communications unit (PCU) through a network, such as Ethernet or wireless network, and displayed on an operator workstation for a human operator or inspector. A notebook computer may serve as the operator workstation for display of real-time, as well as historical, vehicle records. Images and other vehicle information, such as vehicle license number, radio frequency identification (RFID) tag, vehicle description, and owner or passenger's name may be stored in a database repository, such as a relational database, connected to the network, and can be retrieved and compared with other passage events at a later time. An operator viewing the images can enter additional information related to the images, such as comments and remarks, and archive all of the information for future reference and comparisons. For example, if an image of a passing vehicle shows unusual material, such as contrabands and explosives, the vehicle can be identified and traced using the information saved in the database.

Figure 1:
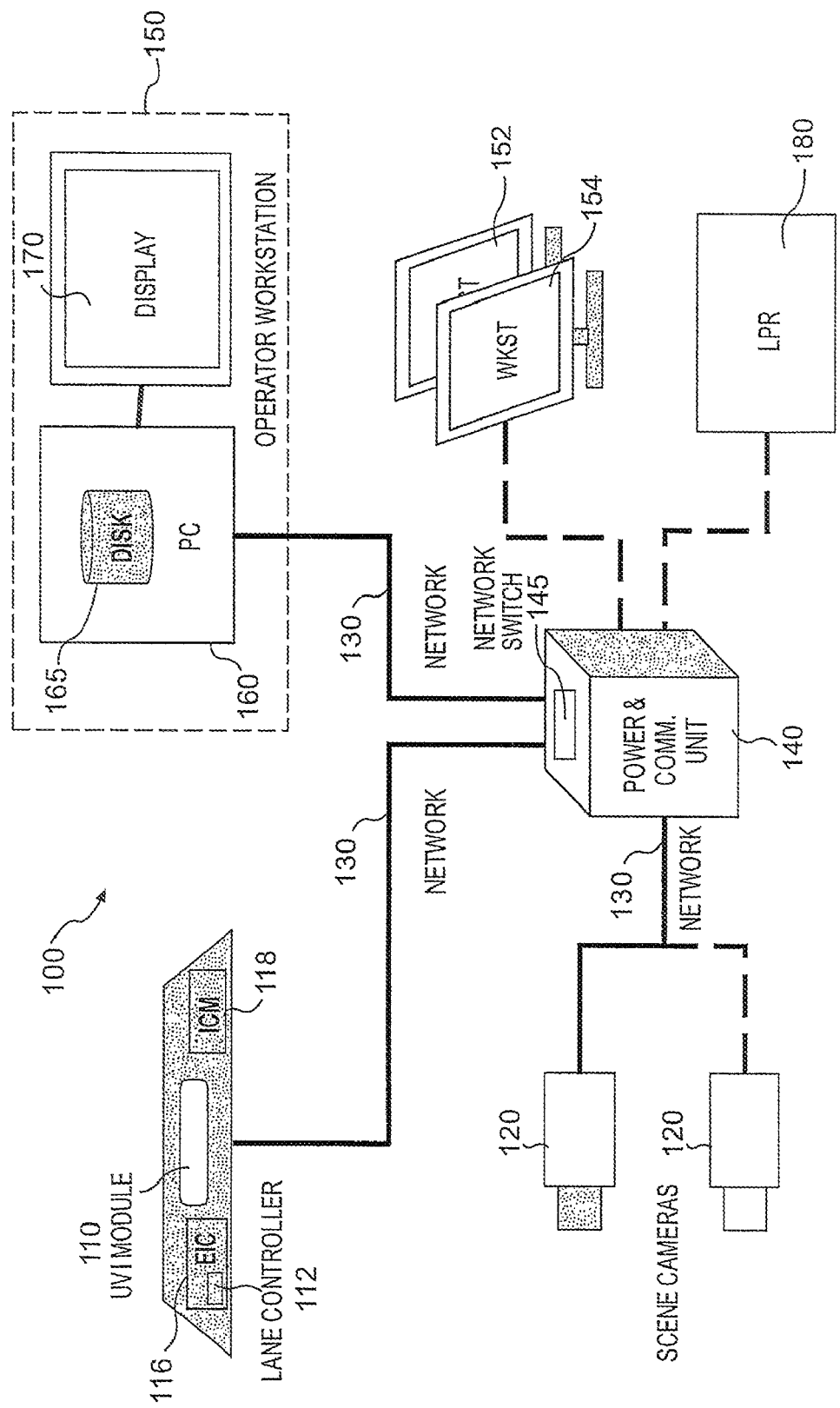
FIG. 1 illustrates an exemplary undercarriage vehicle inspection system (UVIS) that captures, stores, retrieves, and displays vehicle undercarriage images.

FIG. 1 illustrates an exemplary UVIS 100 that captures, stores, retrieves, and displays vehicle undercarriage images. The UVIS 100 may provide synchronized illumination and may include a UVI module 110, one or more scene cameras 120, a PCU 140, and one or more operator workstations 150, 152, 154, all connected to a network 130, such as Ethernet. The UVI module 110 includes an embedded imaging controller (EIC) 116 and an illumination control module (ICM) 118. The EIC 116 includes a software module, referred as a lane controller 112, that controls the image capturing process.

The UVIS 100 may include a license plate reader (LPR) 180 and a proximity card reader (PGR) 185 (shown in FIG. 12) that are connected to the PCU 140 through the network 130. The PCU 140 includes a network switch 145 that controls the transmission of data and images. The operator workstation 150, 152, 154 may include a personal computer (PC) 160 and a display 170. The PC 160 may include a storage disk 165 for storing the images locally.

Figure 2:
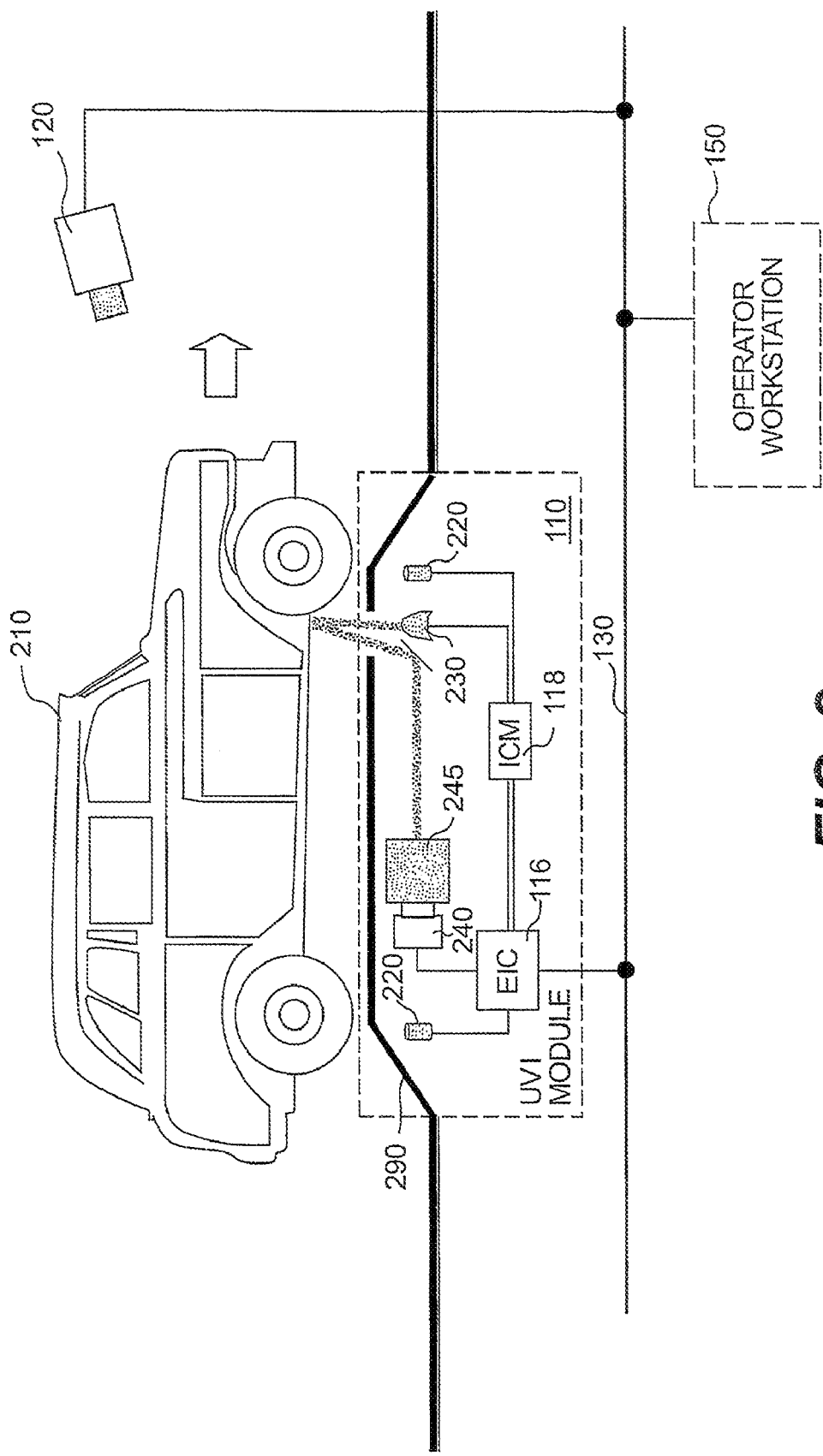
FIG. 2 illustrates an exemplary operation of the UVIS of FIG. 1.

FIG. 2 illustrates an exemplary operation of the UVIS 100. As a vehicle 210 drives over a ramp 290, one or more sensors 220 located in the UVI 110 may detect the presence and direction of the vehicle 210 and may transmit the information to the ICM 118. The ICM 118 is connected to the sensors 220 and controls the operations of one or more illuminators 230, such as white light emitting diode (LED) illuminators or controlled pulse-width-modulated LED illuminators. The EIC 116, coupled to the ICM 118, controls the timing and operation of a camera 240 so that the camera syncs with the illuminators 230. The camera 240 may include a lens 245. The software module, i.e., the lane controller 112, controls the ICM 118 and the EIC 116. The illuminators 230 illuminates the undercarriage of the vehicle 210 while the camera 240 captures an image of the vehicle undercarriage.

The EIC 116 is preferably a fan-less and diskless controller without moving parts. The EIC 116 may include, for example, a 600 mega-hertz (MHz) processor, a 512 mega-byte (MB) double data rate (DDR) memory and a 512 MB compact flash. The EIC 116 may include a peripheral component interconnect (PCI) expansion slot with universal serial bus (USB).

The EIC 116 also controls one or more scene cameras 120 through the network 130. The scene cameras 120 may capture scene images associated with the vehicle and its passengers. Both the vehicle undercarriage image and the vehicle scene images may be transmitted to the PCU 140 and the operator workstations 150 through the network 130.

Figure 3:
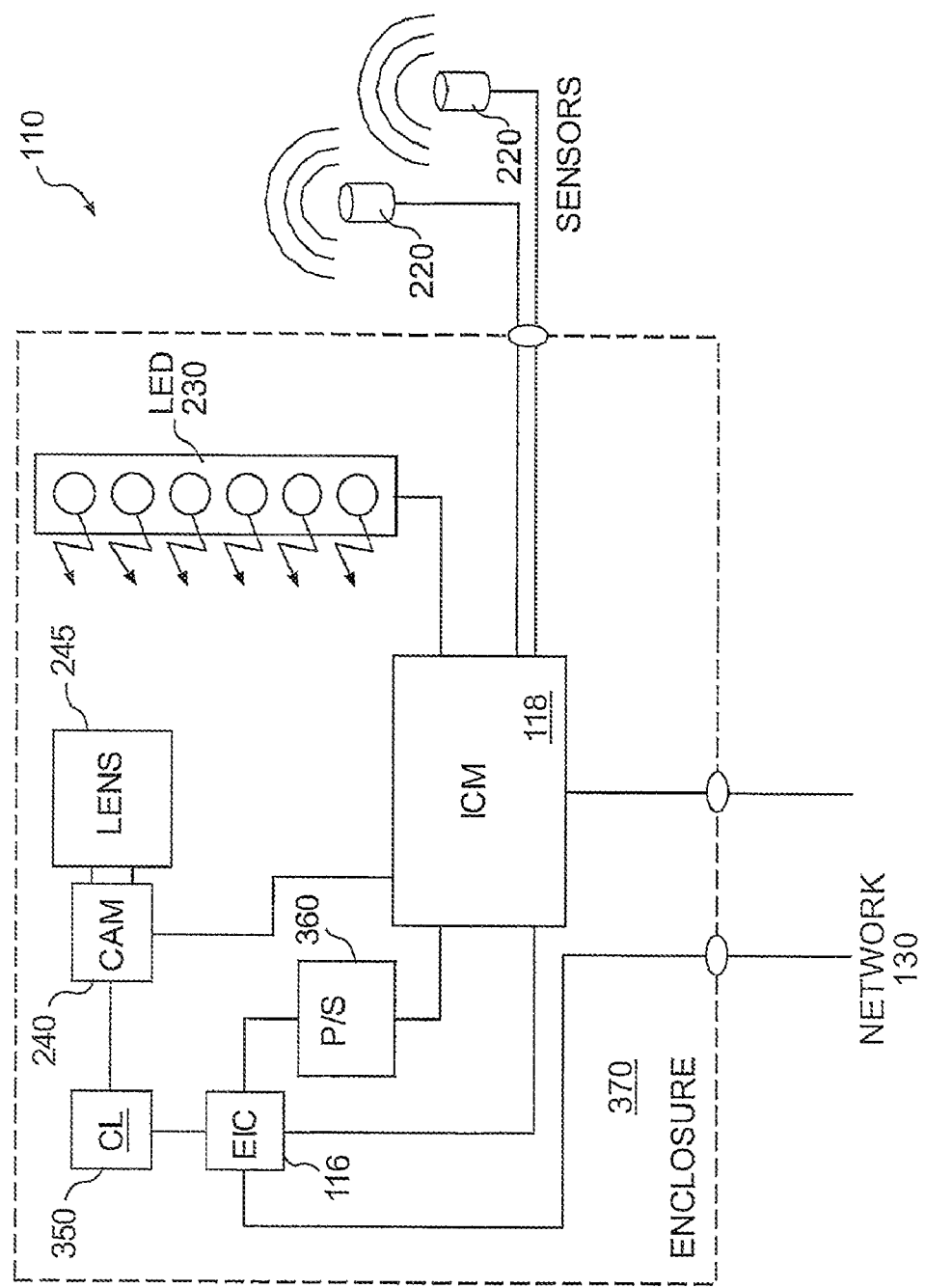
FIG. 3 illustrates an exemplary embodiment of an under vehicle imaging (UVI) module of the UVIS of FIGS. 1 and 2.

FIG. 3 illustrates an exemplary embodiment of the UVI module 110. The UVI module 110 has the processing power to detect, capture, compress, sign, and transmit the vehicle undercarriage images and vehicle scene images. As shown in FIG. 3, the camera 240 and the lens 245 are connected to the EIC 116 using a camera link 350 interface. The camera link 350 is a camera interface with, for example, a 66 MHz, 32-bit PCI. The camera 240 is also connected to the ICM 118, which is coupled to the EIC 116. Both the EIC 116 and the ICM 118 are connected to a power supply 360 and to the network 130. The power supply 360 may be, for example, a fan-less power supply of 60 watt with 12 volts (V) direct current (DC)-DC ATX converter for compact design. The camera 240, the lens 245, the EIC 116 and the ICM 118 may be contained in a waterproof sealed imaging enclosure 370 for protection.

Figure 4:
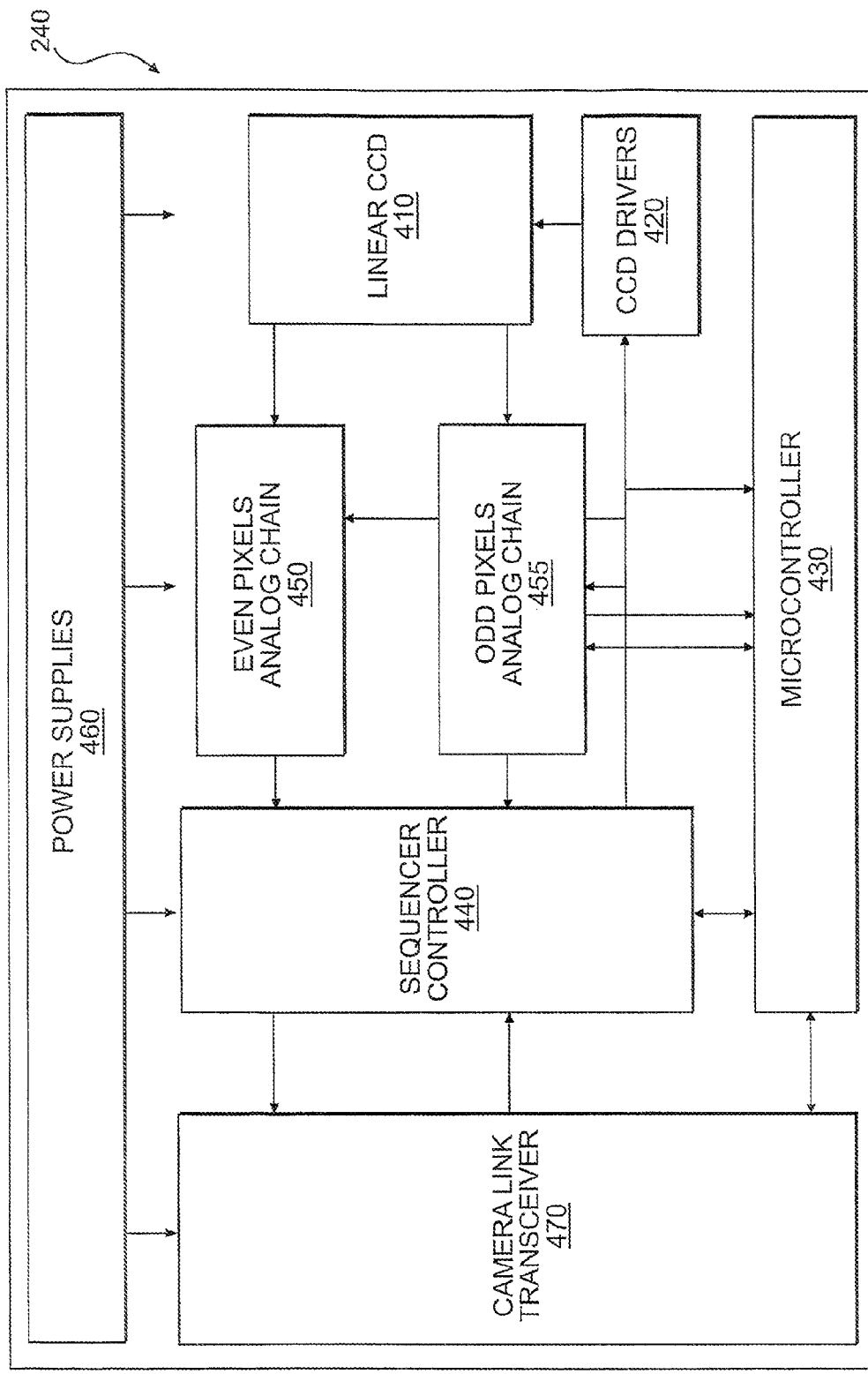
FIG. 4 illustrates an exemplary camera of the UVI module of FIG. 3.

FIG. 4 illustrates an exemplary camera 240 of the UVI module 110. The camera 240 is preferably a high-resolution color line scan camera without motion color skew distortion, such as a monoline RGB line scan camera. The camera 240 may provide flat-field correction and contrast expansion functions. The camera 240 may also have embedded white balance and color space correction. The camera 240 preferably has a compact mechanical design that incorporates a 4K color linear sensor. The camera 240, coupled to the illuminators 230, may produce a color image of the undercarriage of a vehicle.

Referring to FIG. 4, the camera 240 may be based on a two tap linear CCD sensor 410 controlled by CCD drivers 420. Two analog chains 450, 455 may process the odd and even pixel outputs of the linear CCD sensor 410. A microcontroller 430 may control a sequencer controller 440, which processes the images passed from the analog chains 450, 455. A camera link transceiver 470 transmits the image output to the camera link 350 (shown in FIG. 3). The camera 240 may be clocked externally, enabling system synchronization and multi-camera synchronization. The camera 240 may be powered by a single DC power supply 460 with, for example, 12V to 24V of power. One skilled in the art will appreciate that other types of cameras may be used with the UVIS 100, such as FOVEON X3 direct sensor cameras.

Figure 5:
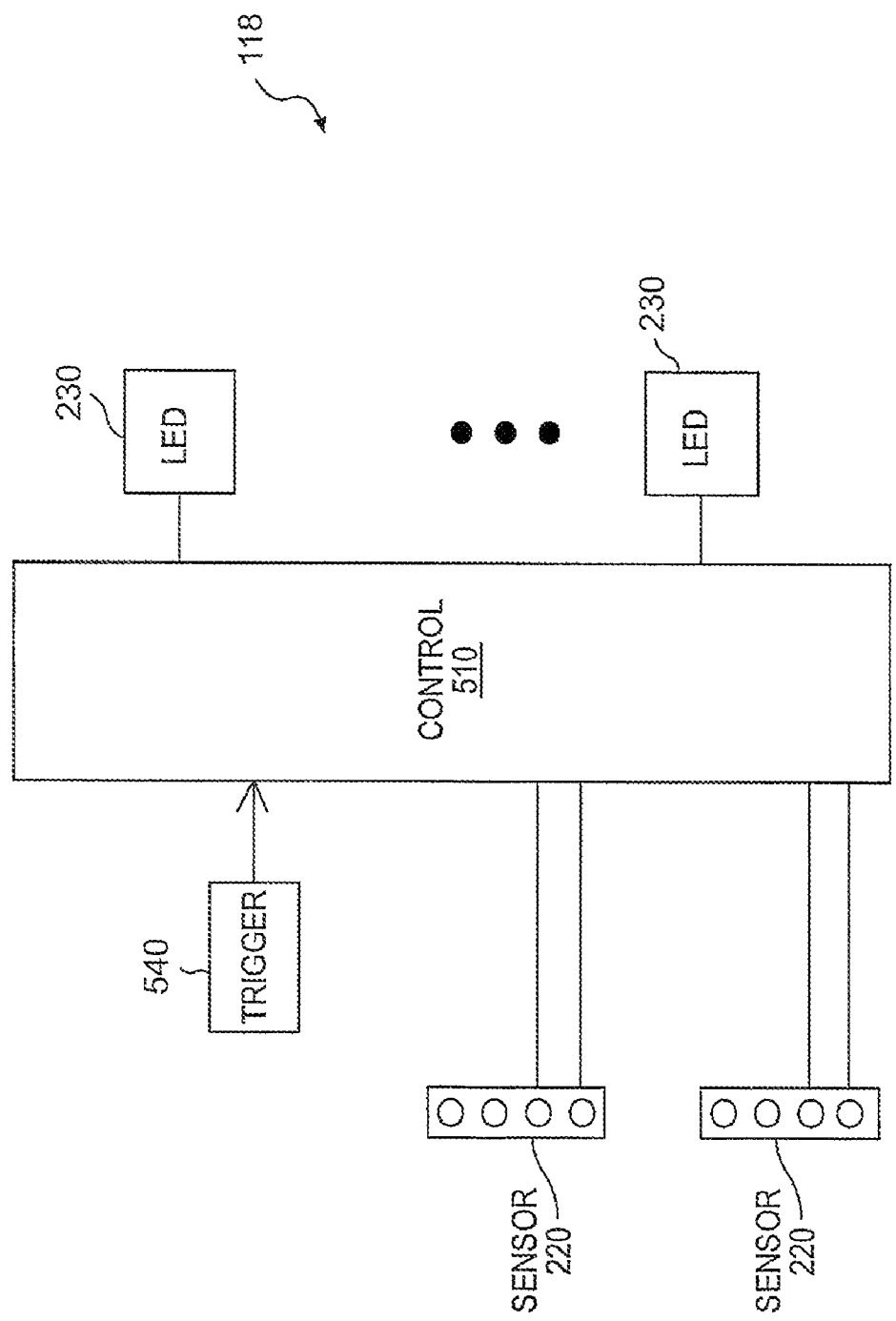
FIG. 5 illustrates an exemplary illumination control module (ICM) of the UVI module of FIG. 3.

FIG. 5 illustrates an exemplary ICM 118 that controls the sensors 220 and the illuminators 230. The ICM 118 includes a control 510 coupled to the sensors 220 and the illuminators 230. The control 510 is also coupled to a trigger 540. The sensors 220 may be, for example, passive 3-axis magneto-resistive sensors with 20 millisecond (MS) response time. The sensors 220 may detect both the presence and direction of travel of each vehicle, using sensor sequence, for example. The ICM 118 may use the lane controller 112 to monitor the signals from the sensors 220 and may determine when to capture the vehicle scene images and when to start and stop the image scan (in the correct orientation) of the undercarriage of the vehicle. The EIC 116 (shown in FIG. 3) may use the lane controller 112 to control the scene cameras 120 and the camera 240 to capture the images. A mirror 720 (shown in FIG. 7) may be adjusted to align the optical axis of the camera 240 with the illumination to capture vehicle undercarriage images. A software algorithm may be used to capture images in the correct orientation based on the direction of travel of the vehicle. As a result, minimal operator intervention is required for capturing the images. A watchdog (not shown) may be used to monitor performance of all components of the ICM 118. If the watchdog detects failure of one or more components of the ICM 118, the watchdog may reset a microprocessor on the ICM 118 to recover from the failure.

Specifically, the sensor 220 detects the presence of a vehicle that have come within the sensor's sensing field by sensing 3-dimensional changes to the earth's magnetic field caused by the presence of the vehicle. The sensor 220 uses three mutually perpendicular magneto-resistive transducers. Each transducer detects magnetic field changes along one axis. By incorporating three sensing elements, maximum sensor sensitivity is achieved. An approaching vehicle may alter the local, ambient, magnetic field surrounding the vehicle. The magnitude of this magnetic field change is dependent both on the vehicle's size, shape, orientation, and composition, and on the ambient magnetic field. During a simple programming procedure, the sensor 220 measures the ambient magnetic field. When a vehicle alters that magnetic field, the sensor 220 detects the magnetic filed changes. When the degree of magnetic field change reaches the sensor's threshold, the sensor's discrete outputs switch, signaling the presence of the vehicle.

FIGS. 6A and 6B illustrate twelve exemplary illuminators 230 controlled by the ICM 118. Twelve illuminators 230 are used for illustration purposes only, one skilled in the art will appreciate that other types and numbers of illuminators 230 may be used with the UVIS 100. The illuminators 230 may be mounted onto an aluminum-core printed circuit board (PCS), allowing for easy assembly, optimum cooling, and accurate light center positioning. The illuminators 230 may produce a uniformly illuminated image by varying the turn-on times and duration of the illuminators 230 to compensate for a wide-angle lens 245 on the camera 240.

FIG. 6C illustrates a single illuminator 230 with an optical lens 650, such as a wide-angle elliptical-beam optical lens, that combines the light output of adjacent illuminators 230 to produce a uniform illumination pattern. The optics of the lens 650 may be made from lens quality polycarbonate that exhibits high thermal stability and long term durability.

Figure 6D:
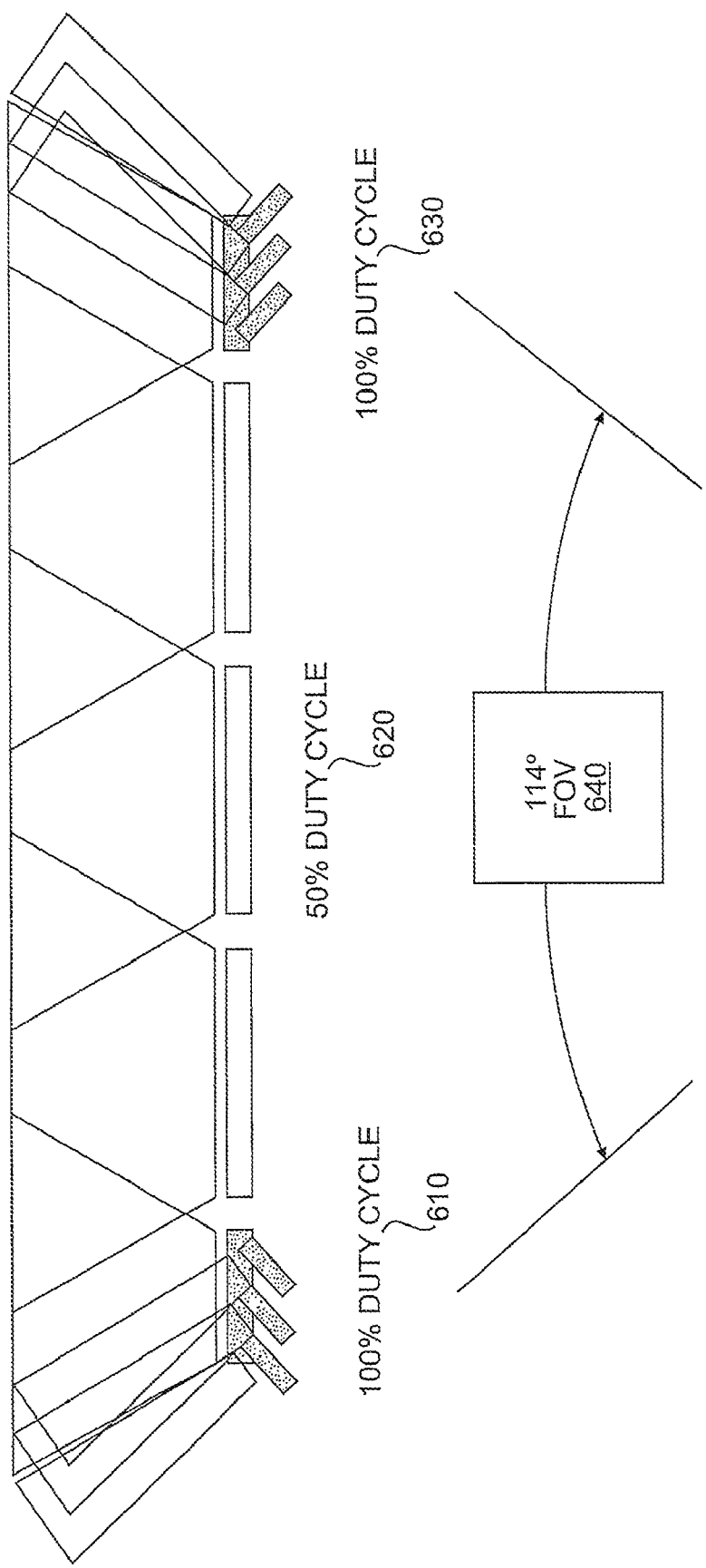
FIG. 6D illustrates an exemplary illumination arrangement composed of strands of illuminators of FIGS. 6A-6C.

FIG. 6D illustrates an exemplary illumination arrangement composed of strands of illuminators of FIGS. 6A-6C. A 114° field-of-view (FOV) 640 of the wide-angle lens is shown. Uniform illumination across this wide angle FOV is achieved by illumination arrangement composed of illuminators 230. A 50% duty cycle 620 intensity is used around the center of the illuminator arrangement and a 100% duty cycle 610, 630 intensity is used at the edges of the illuminator arrangement. This design effectively blends light from multiple illuminators 230.

Figure 7:
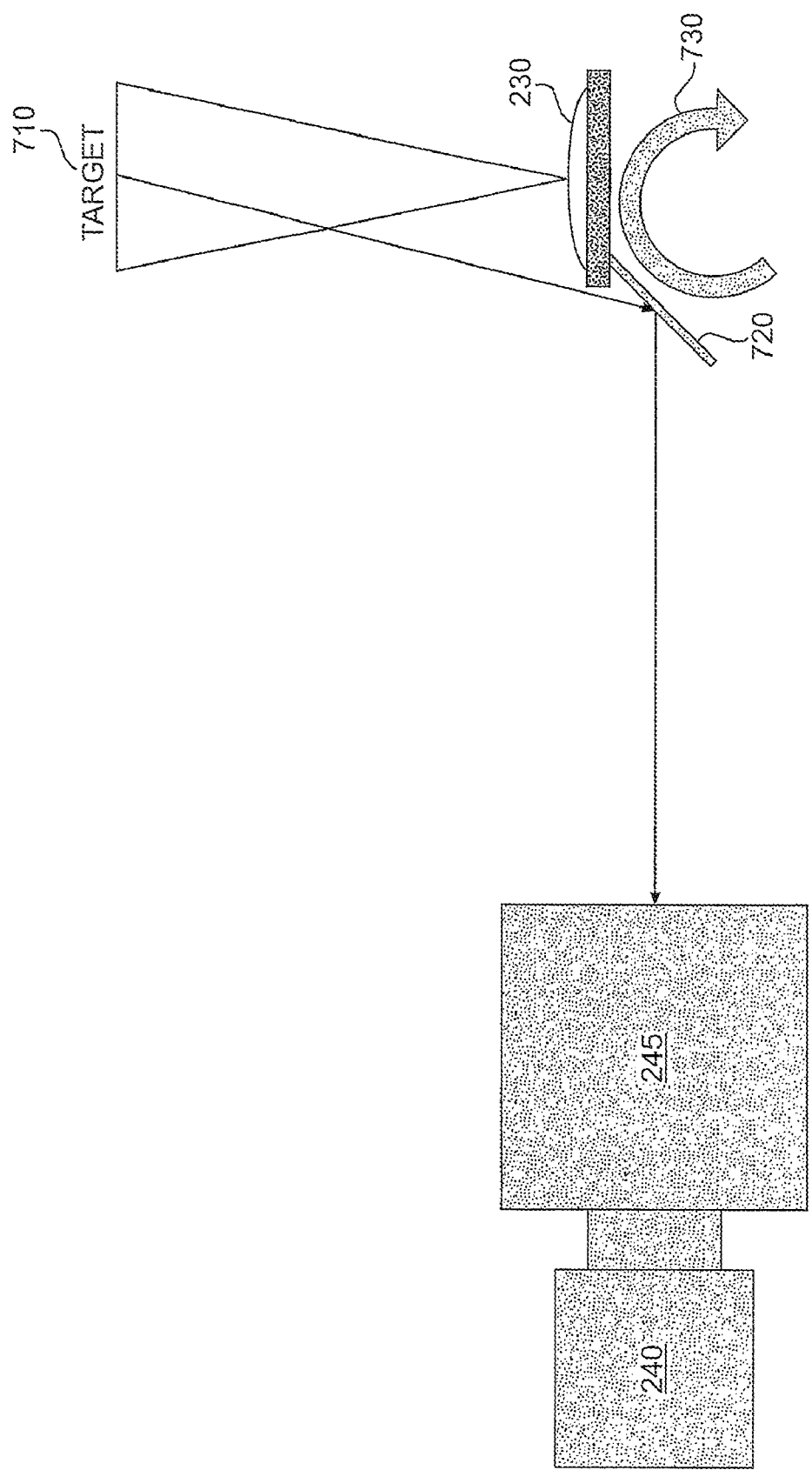
FIG. 7 illustrates an exemplary mirror used with the camera of FIG. 4.

FIG. 7 illustrates an exemplary mirror 720 used to direct an image of a target 710 into the camera 240 through the lens 245. Referring to FIG. 7, the target 710 may be illuminated by the illuminators 230. The mirror 720 is adjustable (in the direction of the arrow 730) to align the camera's 240 optical axis with the illuminators' 230 illumination field. The "folded-optical-axis" architecture may be used to extend the effective "working distance" of the camera-lens combination while minimizing the overall dimensions of the UVI module 110.

Figure 8:
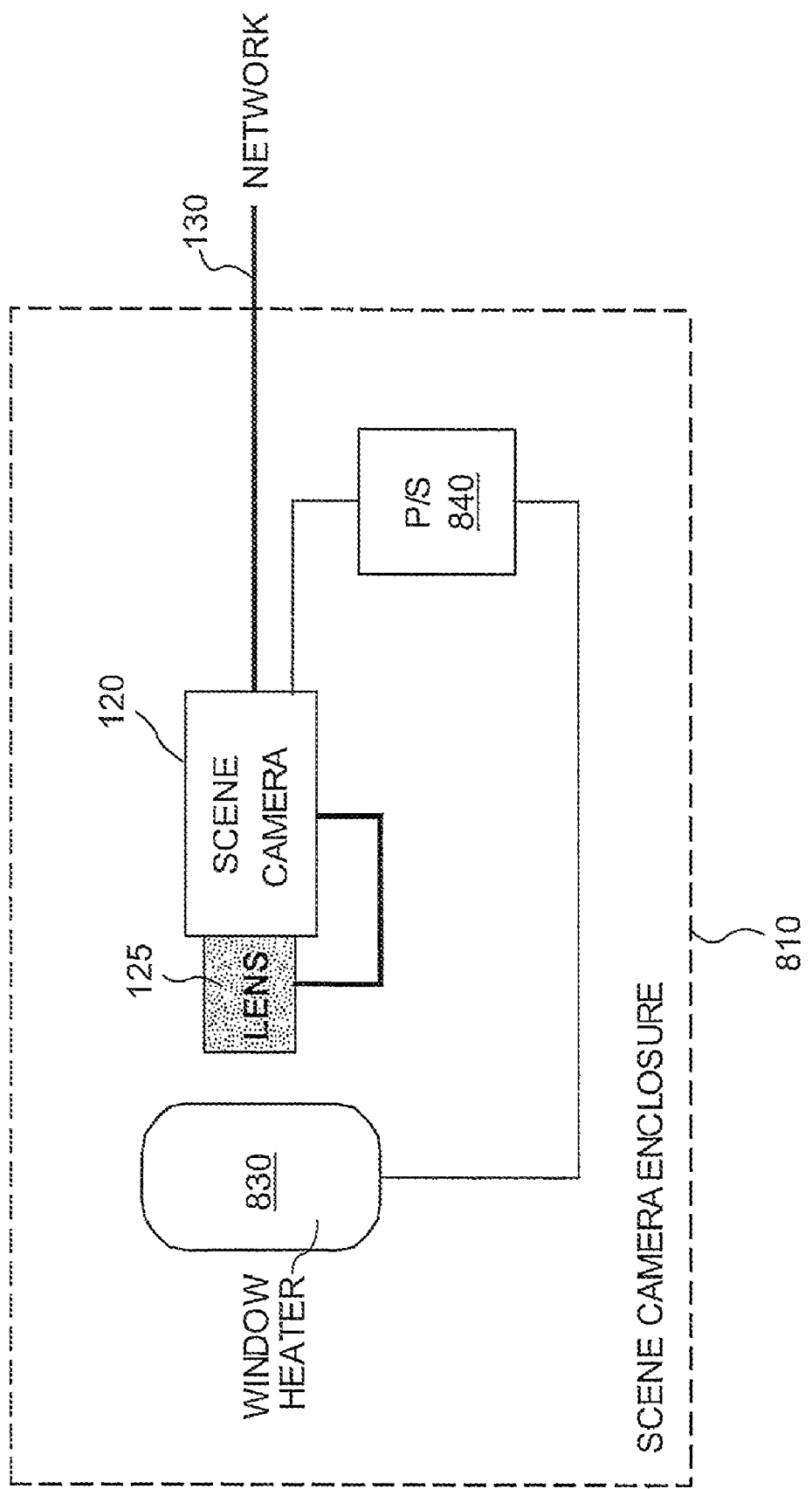
FIG. 8 illustrates an exemplary scene camera of the UVI module of FIG. 3.

FIG. 8 illustrates an exemplary scene camera 120 with a lens 125, such as an auto-iris lens or a 3.5-8.0 mm vari-focal lens. The scene camera 120 may be an Ethernet color camera with a ⅓ inch CCD and with variable focal lens, which is easy to manually adjust. The scene camera 120 and the lens 125 may be connected to the PCU 140 (shown in FIG. 1) through the network 130. The scene camera 120 is coupled to a power supply 840, with, for example, 24V alternating current (AC) input power. The power supply 840 supplies power to the scene camera 120 and a window heater 830 for defrost purposes. The scene camera 120, the lens 125, the power supply 840, and the window heater 830 may be contained in a scene camera enclosure 810, such as an IP65 rated enclosure, for protection. The scene camera 120 may be free standing without the need to be mounted to a building. The standoff distance from the UVI module 110 to the scene camera 120 may be, for example, approximately sixty feet. The UVIS 100 may use sufficient illumination to function in all lighting environments for the UVI module 110 and the scene cameras 120.

Figure 9:
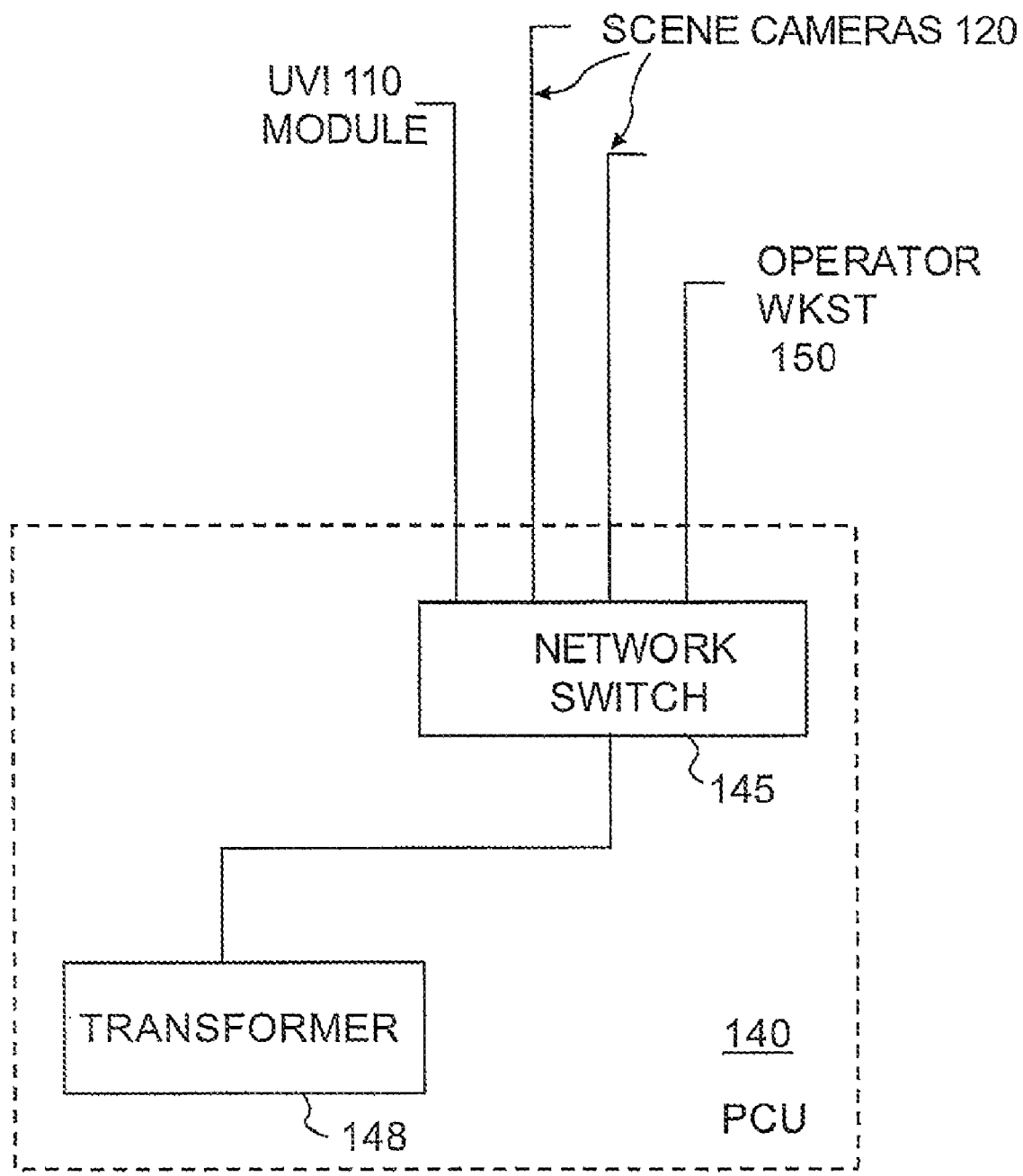
FIG. 9 illustrates an exemplary power and communications unit (PCU) of the UVIS of FIGS. 1 and 2.

FIG. 9 illustrates an exemplary PCU 140 with a network switch 145 and a transformer 148. The network switch 145 is connected to the UVI module 110, the scene cameras 120, and the operator workstations 150. The network switch 145 may be a 5-port or a 9-port industrial Ethernet switch. The network switch 145 may ensure the reliability of the network 130 with automatic switch over on detected failures. One skilled in the art will appreciate that other types of switches can be used with the UVIS 100. The transformer 148 may supply, for example, 120V or 240V AC as primary power and 24V AC as secondary power. The transformer 148 may have fused output and may have a weight of, for example, 15 lbs. A circuit beaker can also be used inside the PCU 140 to provide over-current protection.

Figure 10:
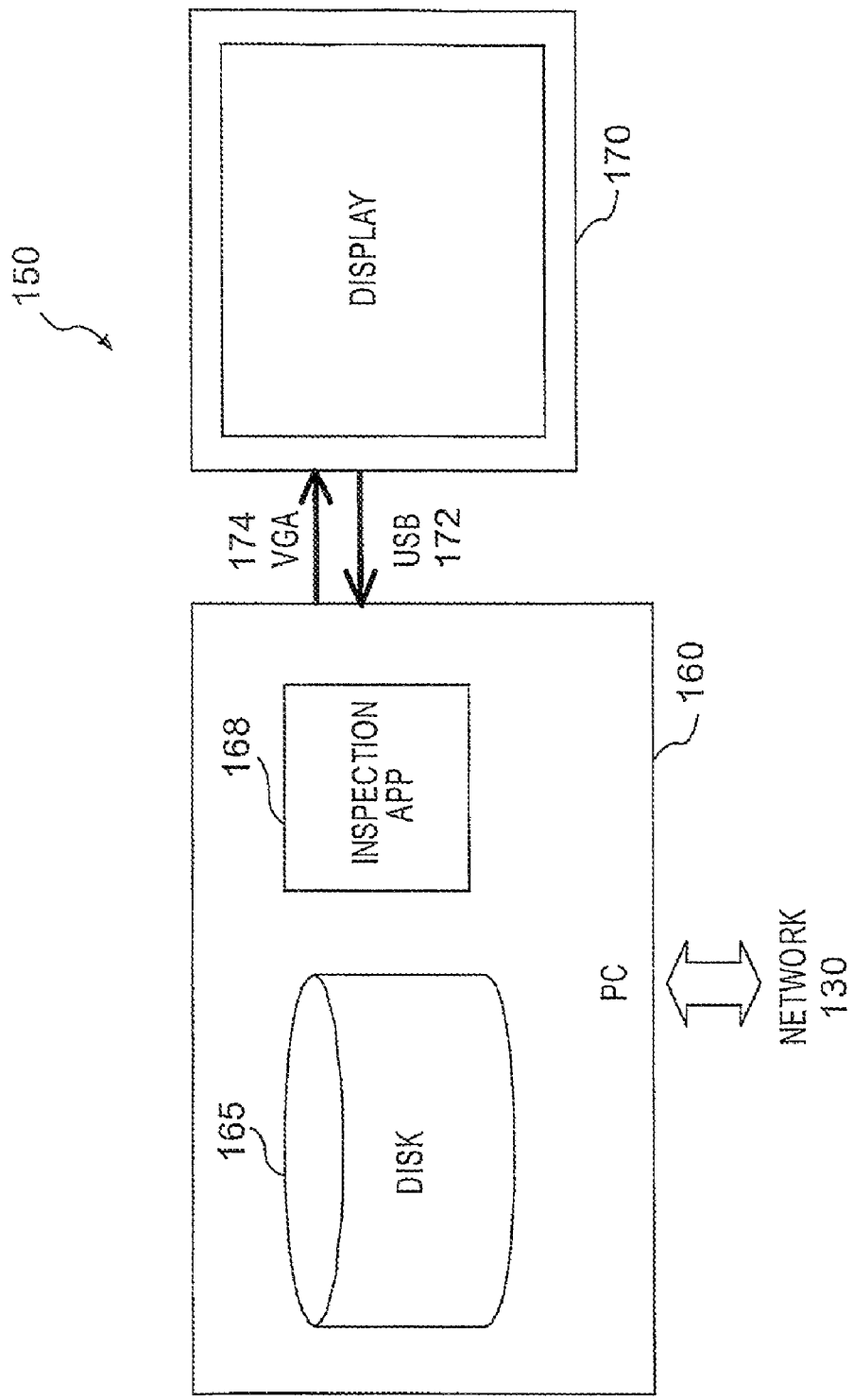
FIG. 10 illustrates an exemplary operator workstation of the UVIS of FIGS. 1 and 2.

FIG. 10 illustrates an exemplary operator workstation 150 that includes a personal computer (PC) 160 and a display 170. The display 170 may be plugged into the PC 160, e.g., using USB 172. Images may be supplied to the display 170 from the PC 160 in video graphic array (VGA) 174. The PC 160 may include a large disk 165 for image archive and storage. The PC 160 may include an inspection application 168 that enables an operator to inspect the vehicles passing through the UVI module 110. The operator workstation 150 may be sized and configured to be compatible with a particular inspection application 168. The PC 160 may run on an operating system that is easy to upgrade and to incorporate enhancements. The PC 160 may be a notebook computer equipped with, for example, a Pentium M 1.1 giga-hertz (GHz) processing power, a 60 giga-byte (GB) disk, and a 256 MB memory. The PC 160 may be operated with or without the use of a keyboard and mouse.

The display 170 may be a touch screen display. For example, a 19" liquid crystal display (LCD) touch screen display with 1280×1024 resolution may be used. Thin film transistor (TFT) type monitors may also be used. The UVIS 100 may support multiple operator workstations 150 simultaneously and independently. The operator may manipulate the images for easier inspection, such as zooming and gamma/contrast/brightness correction. The display 170 may include a previous button to allow viewing of images that were already viewed. The operator may choose between uni-directional and bi-directional traffic hardware option in software. The UVIS 100 is designed to accommodate interfaces with other products such as LPR, RFID, radiation detectors, chemical detectors, and facial recognition.

Figure 11A:
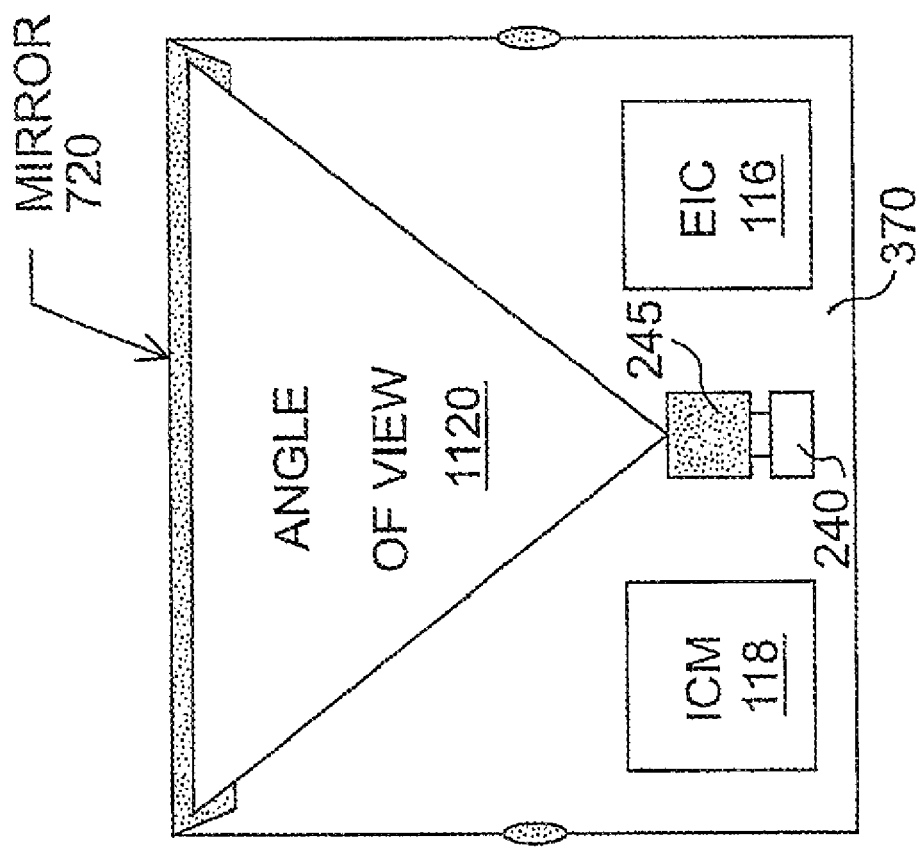
FIG. 11A illustrates an exemplary enclosure that contains various components of the UVI module of FIG. 3.

FIG. 11A illustrates an exemplary enclosure 370, such as a waterproof sealed imaging enclosure. The enclosure 370 may comprehend the camera 240, the lens 245, the ICM 118, the EIC 116, the mirror 720, and the PCU 140 (shown in FIG. 1). The mirror 720 reflects and directs, within an angle of view 1120 images of the undercarriage of a vehicle to the lens 245 for image capturing. The use of the enclosure 370 minimizes the number of signal cables connected to the UVI module 110 because only a network 130 connection and low-voltage AC power are needed. Minimum amount of user connections is necessary. The stand-off distance between the "road-side"

UVI module 110 and the operator workstations 150 may be effectively extended, to, for example, a minimum of one hundred feet. Weather-resistant cable connectors may be used. The enclosure 370 enables the UVIS 100 to work on slightly uneven road surfaces without degradation of the images and to handle vibrations and jarring from normal transport and setup.

FIG. 11B illustrates an exemplary placement of the components of the UVI module 110 within the enclosure 370. As noted above, the enclosure 370 may contain the camera 240, the lens 245, the EIC 116, the ICM 118, and the mirror 720. The illuminators 230 and a network switch 1145 are shown in FIG. 11B as included in the enclosure 370.

The enclosure 370 may be installed underneath a ramp 290, such as a polymer ramp with a height of, for example, 3"-4". The ramp 290 preferably has a skid-resistant surface. The center of the ramp 290 may be cut out to reduce weight. The ramp 290 may be isolated form the UVI module 110 to allow for compression due to heavy vehicles. The ramp 290 may be molded in black for tread pass or otherwise be molded in yellow.

Figure 12:
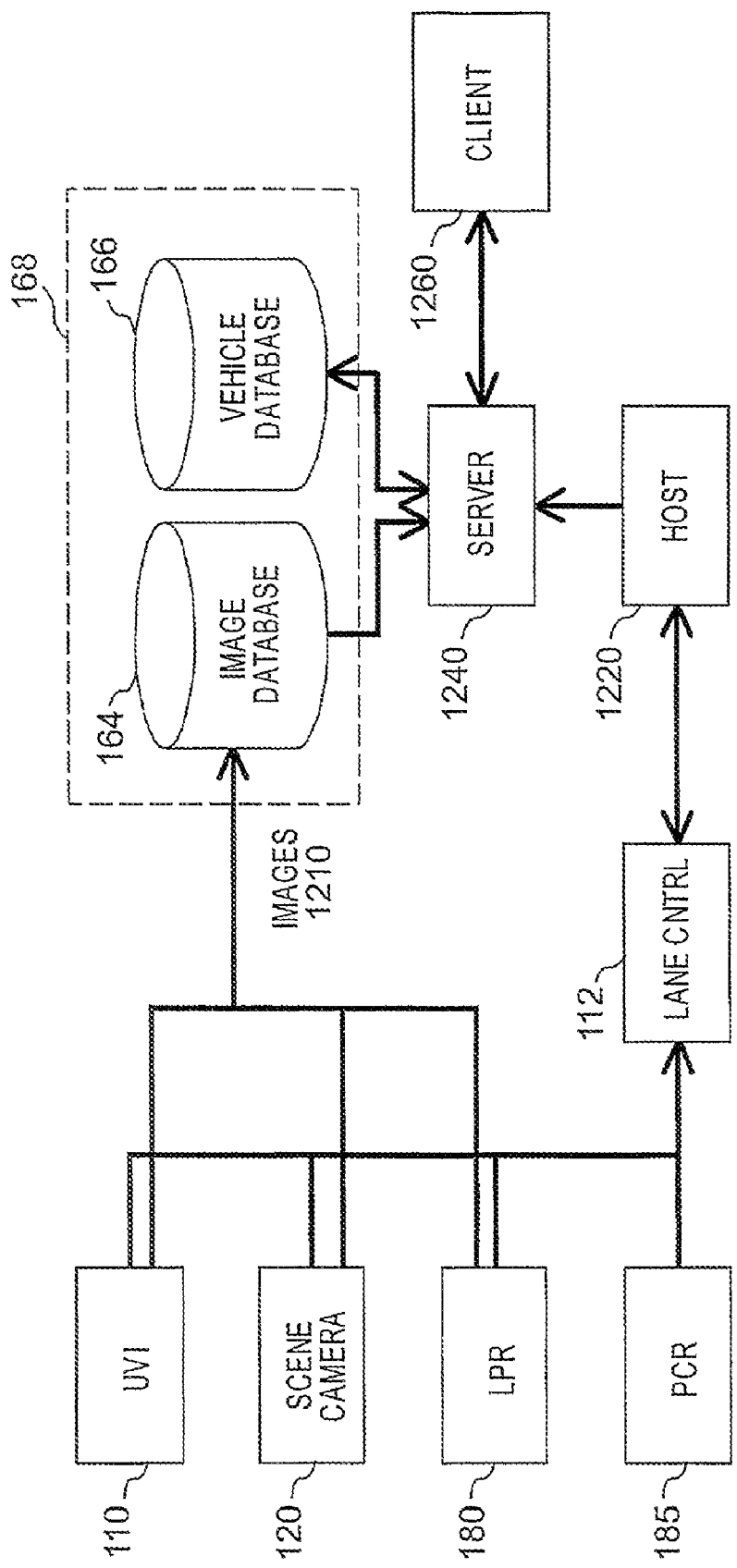
FIG. 12 is an exemplary data flow diagram illustrating how images are captured and transmitted to the operator workstation of FIG. 10.

FIG. 12 is an exemplary data flow diagram illustrating how images are captured and transmitted to operator workstations 150, 152, 154 for inspection and analysis. As shown in FIG. 12, the lane controller 112 controls the image acquiring process and acquires images from the UVI module 110, the scene cameras 120, the LPR 180, and the PCR 185. The lane controller 112 also acquires proximity card information from the PGR 185. The lane controller 112 may transmit the images and the proximity card information to a host 1220 and a server 1240. The host 1220 may archive the images for a certain period of time, such as 30 days, until a certain level of hard drive capacity is reached, such as 85% of hard drive capacity. The server 1240 may allow a client 1260, such as a graphical user interface (GUI) application, to retrieve the images and present to an operator or Inspector. The host 1220, the server 1240, and the client 1260 may be located in one or more of the operator workstations 150.

The Images 1210 obtained from the UVI module 110, the scene cameras 120, and the LPR 180 may also be transmitted to an image database 164 connected to the server 1240. Two or more vehicle scene images may be obtained in conjunction with a corresponding undercarriage image. The images, preferably high-resolution images, may be compressed using an embedded image controller (not shown). Two digital signatures (one public, one private) may be used to guarantee data integrity. The public signature validates the image data. The private signature certifies the public signature. Images may be encrypted to provide additional data security.

Using the information obtained by the LPR 180 and/or the PCR 185, such as the vehicle license number and RFID tag, the server 1240 may access a vehicle database 166 and may obtain associated vehicle data, such as the vehicle description and its owner or passenger's name. The vehicle database 166 and the image database 164 may be part of a larger relational database 168.

The server 1240 may store the images, the associated vehicle data, and the RFID information to be retrieved later by an operator or inspector. The relational database 168 may be used to store the images, the associated vehicle data, and an inspector ID associated with each event, along with a unique location, timestamp, and transaction ID. The information may be stored using a common database definition. The server 1240 may keep a certain number of images, such as twenty images, in a queue for an operator to access, but may store all images that are scanned. The host 1220 may use software architecture, such as the lane controller 112, and database schema to correlate data from disparate sensors 220 to a unique transaction ID associated with each event and store the data on the server 1240.

A single server 1240 may process and store archived images for multiple UVI modules 110. If the server 1240 is unavailable, the individual UVI module 110 may save the images locally and synchronize with the server 1240 when the server 1240 is available.

Figure 13:
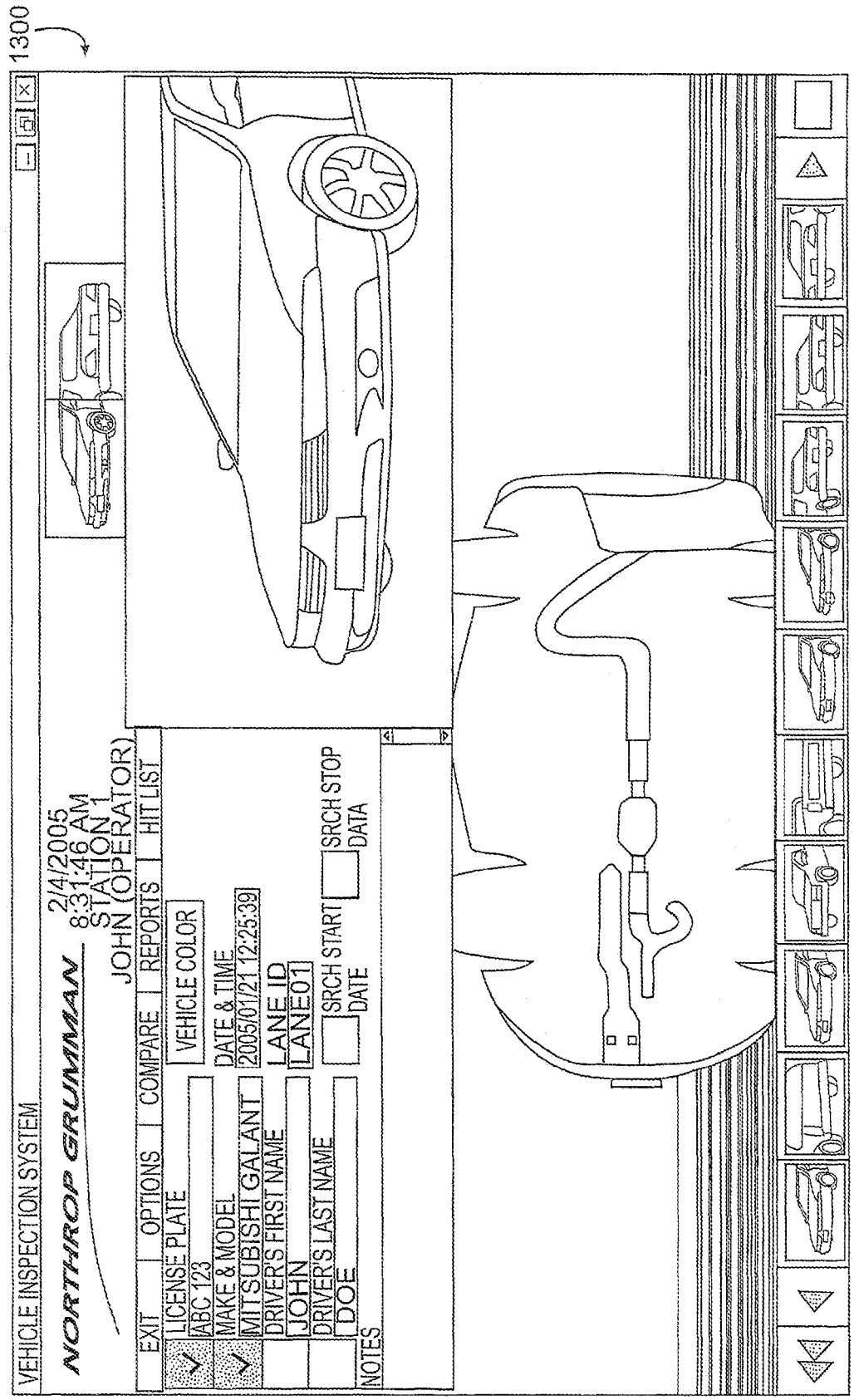
FIG. 13 is an exemplary user interface shown on a display of the operator workstation of FIG. 10.

FIG. 13 is an exemplary user interface application 1300, i.e., inspection application 168, executing on one or more of the operator workstations 150. The UVIS 100 may display to an operator a complete color image of the undercarriage of a vehicle within, for example, one to two seconds from scan completion. Referring to FIG. 13, an operator is presented with the front and rear images of a vehicle and the undercarriage image of the vehicle. The vehicle license number and its make and model are also displayed to the operator, together with the owner's name. The user interface application 1300 may optionally include slide bars for zoom/gamma/brightness/contrast adjustment.

The user interface application 1300, executing on the operator workstations 150, may provide in-sync, side-by-side vehicle image comparison of a current image with a previous image that matches a specified database field. An operator may also retrieve older images by the same match. For example, the user interface application 1300 may enable the operator to view an archived image of the same make and model of the vehicle passing through the UVI module 110 to determine if the vehicle requires further inspection.

The user interface application 1300 may provide dynamic database searches by user-defined parameters. For example, an operator may search for a vehicle using date and time, vehicle license numbers, vehicle's make and model, and owner or passenger's name. The user interface application 1300 also supports automated and manual data entry. The user interface application 1300 may provide a database for input of information related to the images in several predetermined fields that are not required to be filled by an operator. Examples of these predetermined fields include vehicle license number, make and model of the vehicle, color of the vehicle, owner or passenger's name, gate information, date and time, comments section for open text input that accommodates up to, for example, a 2000 character entry. The operator may optionally manually and locally backup the images and the associated vehicle data.

Figure 14:
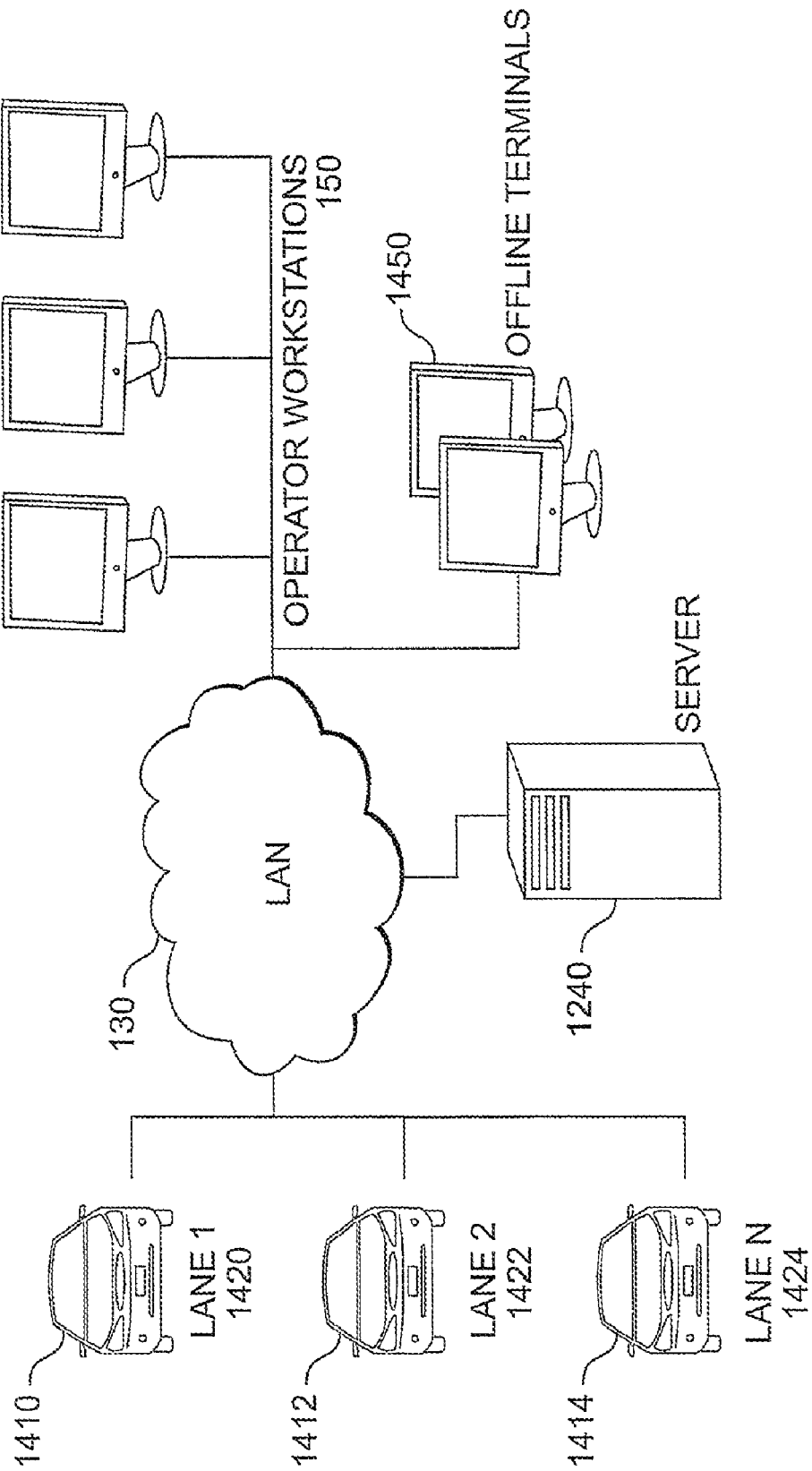
FIG. 14 is an exemplary server-client architecture of the UVIS of FIGS. 1 and 2.

FIG. 14 is an exemplary server-client architecture showing multiple vehicles 1410, 1412, 1414 traveling in multiple lanes 1420, 1422, 1424. Images of the multiple vehicles 1410, 1412, 1414 may be transmitted to the server 1240 through the network 130, such as a local area network (LAN).

The server 1240 may hold thumbnails of multiple vehicles 1410, 1412, 1414 in queue and may store all images and associated vehicle data into a central database repository, such as the relational database 168 (shown in FIG. 12). The relational database 168 may alternatively be a distributed database. The images and associated vehicle data may be retrieved by multiple operator workstations 150 and offline terminals 1450 at a later time.

With continued reference to FIG. 14, the server-client architecture allows a number of UVI modules 110 installed on multiple lanes (in this case N) to connect as separate clients to the same database and to store images and associated vehicle data to the a centralized database. A number of human operators or inspectors can also connect simultaneously to the same database and retrieve vehicle image data for processing or inspection. This architecture eliminates the need to have one inspector per UVI module 110. If traffic allows, a single inspector can process multiple lanes simultaneously. This architecture further allows operators to connect to the same database for offline inspection, i.e. to inspect and peruse the database long after vehicles have been processed and the vehicles' images archived.

The UVIS 100 is light and easy to assemble. An embodiment of the mobile part of the UVIS 100 weighs less than 1000 lbs. All single items that require manual lifting preferably weigh less than 150 lbs each. An embodiment of the UVIS 100 may be assembled in field conditions with minimal tooling in less than one hour. The UVIS 100 may be maintained with minimal preventive maintenance.

The UVIS 100 may function in all weather environments, such as from 32° F. to 104° F. for indoor user interface equipments and 32° F. to 130° F. for outdoor scanning equipments, including rain and bright sunlight without significant degradation of images.

Figure 15:
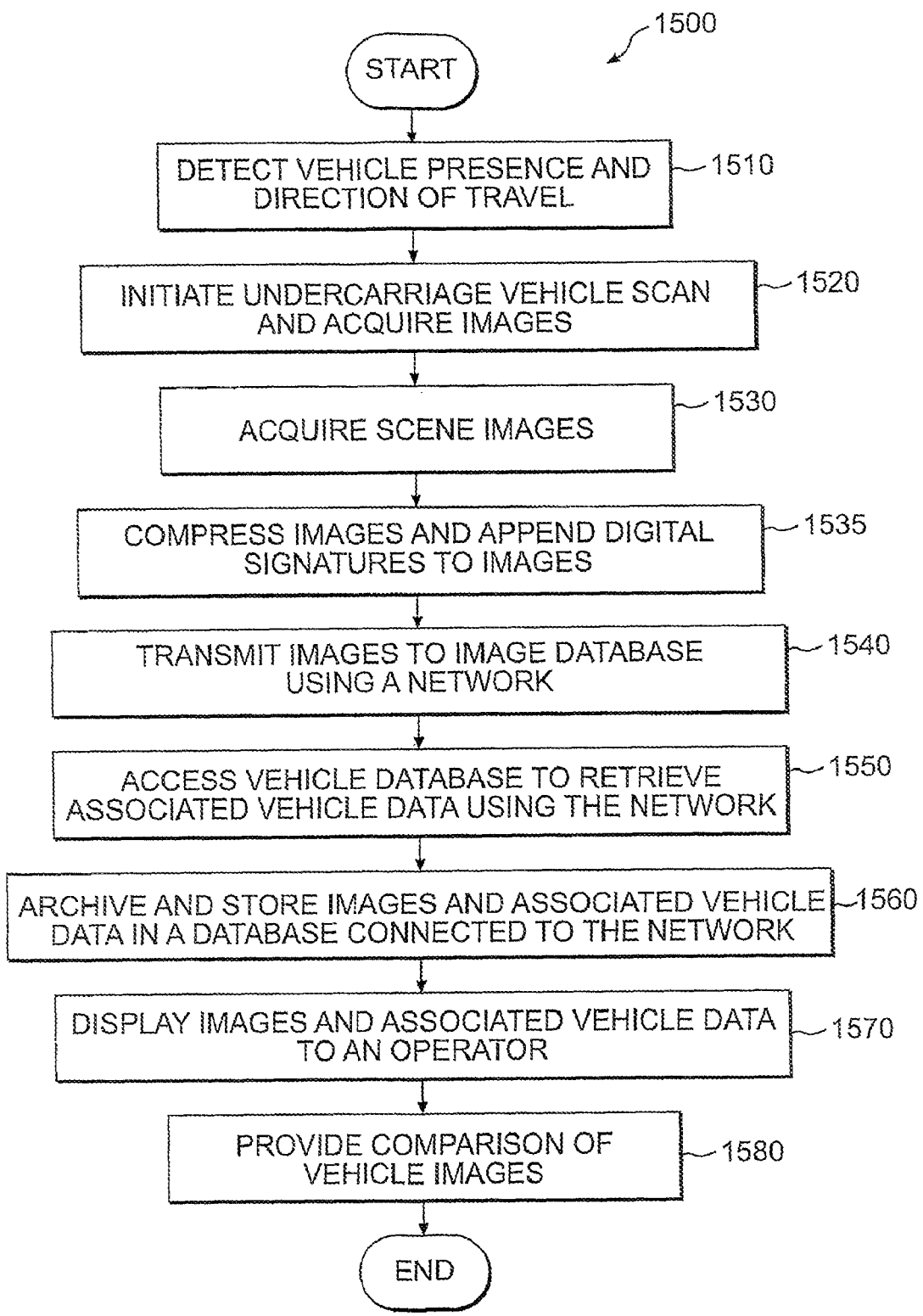
FIG. 15 is a flow chart illustrating an exemplary method for capturing aid displaying vehicle undercarriage images.

FIG. 15 is a flow chart illustrating an exemplary method 1500 for capturing and displaying vehicle undercarriage images. As a vehicle approaches the UVI module 110, the sensor 220 mounted on the leading edge of the UVI module 110 may detect the vehicle presence and the direction of travel (block 1510). Upon receipt of a signal form the sensors 220, the ICM 118 may send a vehicle start message to the lane controller 112, which initiates a vehicle undercarriage scan by sending a vehicle transaction message to the EIC 116, which controls the camera 240 to acquire a vehicle undercarriage image (block 1520).

The lane controller 112 may also send an acquire scene message to the EIC 116, which controls the one or more scene cameras 120 to acquire vehicle scene images (block 1530). The EIC 116 may continue the scanning and imaging until the UVI module's trailing edge sensor 220 indicates the vehicle has passed or the scan timer has expired. After scanning is completed or terminated, the scanned undercarriage image and the associated vehicle scene images may be compressed and signed using digital signatures (block 1535). Next, the undercarriage image and the associated vehicle scene images 1210 may be sent to the image database 164 through the network 130 (block 1540). A vehicle end message may be passed to the lane controller 112.

The user interface application 1300 executing on one or more of the operator workstations 150 may access the vehicle database 166 to retrieve associated vehicle data using the network 130 (block 1550). The images and the associated vehicle data may be archived and stored in a relational database 168 connected to the network (block 1560). The images and the associated vehicle data may be displayed on the display 170 for an operator or inspector (block 1570). The server 1240 may allow client software applications 1260, such as the user interface application 1300, to enable comparison of current and historical vehicle images and other associated data (block 1580).

FIG. 16 illustrates exemplary hardware components of a computer 1600 that may be used in connection with the method for capturing and displaying vehicle undercarriage images. The computer 1600 may be, for example, the operator workstations 150. The computer 1600 includes a connection 1620 with the network 130 such as the Internet or other type of computer or telephone network. The computer 1600 typically includes a memory 1602, a secondary storage device 1612, a processor 1614, an input device 1616, a display device 1610, and an output device 1608.

The memory 1602 may include random access memory (RAM) or similar types of memory. The secondary storage device 1612 may include a hard disk drive, floppy disk drive, CD-ROM drive, or other types of non-volatile data storage, and may correspond with various databases or other resources. The processor 1614 may execute information stored in the memory 1602, the secondary storage 1612, or received from the Internet or other network 130. The input device 1616 may include any device for entering data into the computer 1600, such as a keyboard, keypad, cursor-control device, touch-screen (possibly with a stylus), or microphone. The display device 1610 may include any type of device for presenting visual image, such as, for example, a computer monitor, flat-screen display, or display panel. The output device 1608 may include any type of device for presenting data in hard copy format, such as a printer, and other types of output devices including speakers or any device for providing data in audio form. The computer 1600 can possibly include multiple input devices, output devices, and display devices.

Although the computer 1600 is depicted with various components, one skilled in the art will appreciate that the computer 1600 can contain additional or different components. In addition, although aspects of an implementation consistent with the method for capturing and displaying vehicle undercarriage images are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 1600 to perform a particular method.

While the apparatus and method for capturing and displaying vehicle undercarriage images have been described in connection with an exemplary embodiment, those skilled in the art will understand that many modifications in light of these teachings are possible, and this application is intended to cover variations thereof.

The invention claimed is:

1. A method for capturing and displaying vehicle undercarriage images, the method comprising:
   detecting a vehicle's presence;
   acquiring an undercarriage image of an undercarriage of the vehicle using a single line scan camera;
   acquiring scene images associated with the vehicle using one or more scene cameras, wherein the line scan camera and the one or more scene cameras are controlled by an under vehicle imaging (UVI) module and a power and communications unit (PCU), and wherein the UVI and the PCU are connected to a network;
   transmitting the undercarriage image and the scene images to one or more operator workstations through the network;
   storing the undercarriage image and the scene images in a relational database connected to the network; and
   displaying the undercarriage image and the scene images to an operator.

2. The method of claim 1, further comprising retrieving associated vehicle data from a vehicle database connected to the network, wherein the associated vehicle data is stored in the relational database and displayed to the operator.

3. The method of claim 1, further comprising detecting a direction of travel of the vehicle.

4. The method of claim 1, further comprising:
   archiving the undercarriage image and the scene images; and
   providing comparison of current and historical images for the operator.

5. The method of claim 1, wherein the acquiring the undercarriage image step includes using a high-resolution color line camera and a rotatable mirror to align an optical axis of the camera with an output of an illuminator arrangement to capture a color undercarriage image in a correct orientation.

6. The method of claim 1, further comprising illuminating the undercarriage of the vehicle during the acquiring the undercarriage image step using one or more light emitting diode (LED) illuminators.

7. The method of claim 6, further comprising using controlled pulse-width-modulated LED illuminators for the illuminating step.

8. The method of claim 1, wherein the line scan camera has flat-field correction and contrast expansion capabilities.

9. The method of claim 1, further comprising clocking the line scan camera externally to achieve multi-camera synchronization.

10. The method of claim 1, further comprising using a network switch to control the transmission of the undercarriage image and the scene images.

11. The method of claim 1, further comprising using a touch screen display to display and manipulate the undercarriage image and the scene images.

12. The method of claim 1, further comprising enclosing the UVI module and the PCU in a waterproof sealed imaging enclosure.

13. The method of claim 12, further comprising embedding the enclosure in a polymer ramp.

14. The method of claim 1, further comprising compressing and signing the undercarriage image and the scene images.

15. The method of claim 1, further comprising obtaining a vehicle description and the vehicle's owner and passenger's names from a vehicle database connected to the network.

16. The method of claim 1, further comprising:
assigning a unique transaction identification (ID) associated with each event; and
correlating images and associated vehicle data acquired from disparate sensors to the unique transaction ID, wherein the associated vehicle data includes license plate numbers and radio frequency identification (RFID) data.

17. The method of claim 1, further comprising providing in-sync, side-by-side vehicle image comparison of a current image with a previous image that matches a specified database field.

18. The method of claim 1, further comprising providing automated and manual data entry for the operator.

19. The method of claim 1, further comprising acquiring undercarriage images and associated scene images from multiple vehicles driving on multiple lanes.

20. The method of claim 1, further comprising using a single server to process and store images for multiple UVI modules.

21. An apparatus for capturing and displaying vehicle undercarriage images, comprising:
an under vehicle imaging (UVI) module, comprising:
one or more sensors that detect a vehicle's presence;
a single line scan camera that acquires an undercarriage image of an undercarriage of the vehicle;
one or more scene cameras that acquire scene images associated with the vehicle;
an embedded imaging controller (EIC) that controls the line scan camera and the one or more scene cameras;
an illumination control module (ICM) that is connected to the one or more sensors and controls one or more illuminators, wherein the illuminators illuminate the undercarriage of the vehicle when the line scan camera acquires the undercarriage image;
a power and communications unit (PCU) connected to the UVI module, wherein the UVI and the PCU are connected to a network, and wherein the undercarriage image and the scene images are transmitted through the network to one or more operator workstations; and
a relational database connected to the network for storing the undercarriage image, and the scene images.

22. The apparatus of claim 21, wherein the one or more sensors detects a direction of travel of the vehicle.

23. The apparatus of claim 21, further comprising an inspection application that provides comparison of current and historical images for the operator.

24. The apparatus of claim 21, further comprising a host that archives the undercarriage image and the scene images.

25. The apparatus of claim 21, further comprising a rotatable mirror that enables an alignment of an optical axis of a color line scan camera with an output of an illuminator arrangement to capture a color undercarriage image in a correct orientation.

26. The apparatus of claim 21, further comprising a vehicle database connected to the network that provides a vehicle description and the vehicle's owner and passenger's names.

27. The apparatus of claim 21, wherein the line scan camera is a high-resolution color line scan camera and is clocked externally for multi-camera synchronization.

28. The apparatus of claim 21, further comprising a network switch that controls the transmission of the undercarriage image and the scene images.

29. The apparatus of claim 21, further comprising a touch screen display that enables manipulation of the undercarriage image and the scene images.

30. The apparatus of claim 21, further comprising a waterproof sealed imaging enclosure that contains the UVI module and the PCU, wherein the enclosure is embedded in a polymer ramp.

31. The apparatus of claim 21, further comprising an embedded imaging controller feat compresses and signs the undercarriage image and the scene images.

32. The apparatus of claim 21, further comprising a lane controller that assigns a unique transaction identification (ID) associated with each event and correlates images acquired from disparate sensors to the unique transaction ID.

33. The apparatus of claim 21, further comprising an inspection application that provides in-sync, side-by-side vehicle image comparison of a current image with a previous image that matches a specified database field.

34. The apparatus of claim 21, further comprising an inspection application that provides automated and manual data entry for the operator.

35. The apparatus of claim 21, wherein the PCU acquires undercarriage images and associated scene images from multiple vehicles driving on multiple lanes.

36. The apparatus of claim 21, further comprising a single server that processes and stores images for multiple UVI modules.

37. A computer readable medium providing instructions for capturing and displaying vehicle undercarriage images, the instructions comprising:
detecting a vehicle's presence;
acquiring an undercarriage image of an undercarriage of the vehicle using a single line scan camera;
acquiring scene images associated with the vehicle using one or more scene cameras, wherein the line scan camera and the one or more scene cameras are controlled by an under vehicle imaging (UVI) module and a power and communications unit (PCU), and wherein the UVI and the PCU are connected to a network;

transmitting the undercarriage image and the scene images to one or more operator workstations through the network;

storing the undercarriage image and the scene images in a relational database connected to the network; and displaying the undercarriage image and the scene images to an operator.

* * * * *